Patented Feb. 19, 1952

2,586,387

UNITED STATES PATENT OFFICE 2,586,387

ARYL MERCURY SALTS OF CHLORO SUBSTITUTED PHENOXYACETIC ACIDS

Paul A. Sartoretto, New York, N. Y., assignor to W. A. Cleary Corporation, a corporation of New Jersey No Drawing. Original application March 21, 1947, Serial No. 736,412. Divided and this application February 5, 1951, Serial No. 209,511

8 Claims. (Cl. 260—434)

This invention relates to a method of killing weeds in an active state of growth and to the materials that are used in killing the weeds.

This application is a division of my copending application Serial No. 736,412, filed March 21, 1947, now Patent No. 2,545,431.

Various types of weed killers have been proposed and are now being used. These materials have a selective action in that they will kill weeds but will not harm the grass and other useful plants. I have discovered a more efficient weed killer that kills and inhibits the further growth of a greater variety of weeds than was true with former weed killing materials. The new weed killers of this invention are aryl mercury salts of 2,4-dichlorophenoxy acetic acid, 2,5-dichlorophenoxy acetic acid, and 2,4,5-trichlorophenoxy acetic acid. The new salts are reaction products of aryl mercury compounds and the above acids.

The new weed killing salts are used in a carrier. This carrier can be either a solvent, a water-soluble solvent for the salt and water, or an inert powder such as finely-divided clays, calcium carbonate, and the like. The water-soluble solvents for the salts may be alcohols, preferably the lower aliphatic alcohols, formamide, carbitol, and the like. The salts are preferably used in a concentration of about one part of the salt per 1,000 to 80,000 parts of a carrier. The stronger solutions may be used in a single treatment, but this is not recommended as it may kill all plant growths in the treated area. The preferred way of using the weed killers is to apply them at intervals to a given area under treatment. This destroys the weeds without harming the grass and prevents new growths of weeds. The weed killers may be applied in a concentration of ten gallons per 1,000 square feet at intervals of five to thirty days for about three months. This will serve to kill any weeds that may be present and prevent the growth of other weeds.

The salts are preferably prepared by using equal molar proportions of an aryl mercury salt, preferably of an organic acid, and either 2,4-dichlorophenoxy acetic acid, 2,5-dichlorophenoxy acetic acid, or 2,4,5-trichlorophenoxy acetic acid.

The new salts are preferably used in conjunction with boric acid and an alkanolamine such as an ethanolamine. These materials make the solutions of the salt more stable and increases their potency. The boric acid and alkanolamine are preferably used in such concentrations that there is at least one-third molar weight of the boric acid to each hydroxyl equivalent weight of the amine. It is believed that the boric acid and the alkanolamine react to form an alkanolamine borate. The boric acid and alkanolamine may be used in any concentration desired with relation to the weed killing salts so as to provide an excess of one or the other. It is preferred, however, that the concentration be approximately two moles of alkanolamine borate ester to one mole of the aryl mercury salt.

When the aryl mercury salt is used in solution in combination with boric acid and an alkanolamine, it is preferred that the solution have a pH of from about 7.0 to 9.5. If the pH is within this range, the solution is more stable. Excellent stability has been obtained when the pH is within the range of between 7 and 8 and consequently this is the preferred range. In actual practice a pH as near 7.5 as possible is desired.

The new salts can be prepared by mixing the above aryl mercury compound and the acid in the cold. When these reactants are permitted to stand under ordinary atmospheric conditions and at room temperature the new salt is formed in a matter of two or three days. This reaction takes place either in the container in which the reactants are mixed or after the reactants have been applied to the weeds if the reactants are applied to the weeds before the reaction in the container has gone to completion.

The following examples illustrate the invention:

*Example I.*—One mol of 2,4-dichlorophenoxy acetic acid was mixed into one mol of phenylmercuric acetate to form the phenylmercuric salt of 2,4-dichlorophenoxy acetic acid. This compound was then dissolved in ethyl alcohol to provide a solution that could be used for weed killing.

*Example II.*—One mol of 2,4-dichlorophenoxy acetic acid was mixed into one mol of phenylmercuric acetate to form the phenyl mercuric salt of 2,4-dichlorophenoxy acetic acid. This was then mixed with the reaction product prepared by warming ⅓ mol of boric acid with one mol of monoethanolamine until the boric acid is completely dissolved. The mixture was then dissolved in ethyl alcohol to provide a solution that could be used for weed killing.

*Example III.*—The same procedure as in Example I was followed but here the acid compound was 2,5-dichlorophenoxy acetic acid.

*Example IV.*—The same procedure as in Example I was followed except that here the acid was 2,4,5-trichlorophenoxy acetic acid.

In any of the above examples any of the chlorophenoxy acids may be used in place of the one specifically mentioned.

Although the aryl mercury salt is preferably reacted with the acid in approximately equal molar proportions, more or less of either of the reacting materials may be used to provide an excess of that material, if desired.

Having described my invention as related to the embodiments set out herein, it is my intention that the invention be not limited by any of the details of description unless otherwise specified, but rather be constructed broadly within its spirit and scope as set out in the accompanying claims.

I claim:

1. The new compound: the aryl mercury salt of an acid of the class consisting of 2,4-dichlorophenoxy acetic acid, 2,5-dichlorophenoxy acetic acid, and 2,4,5-trichlorophenoxy acetic acid having the structural formula

wherein A is an aryl group and B is a member of the class consisting of 2,4-dichlorophenyl groups, 2,5-dichlorophenyl groups, and 2,4,5-trichlorophenyl groups.

2. The new compound: the phenyl mercury salt of an acid of the class consisting of 2,4-dichlorophenoxy acetic acid, 2,5-dichlorophenoxy acetic acid, and 2,4,5-trichlorophenoxy acetic acid having the structural formula

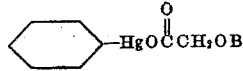

wherein B is a member of the class consisting of 2,4-dichlorophenyl groups, 2,5-dichlorophenyl groups, and 2,4,5-trichlorophenyl groups.

3. The new compound: the aryl mercury salt of 2,4-dichlorophenoxy acetic acid having the structural formula

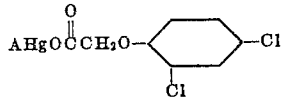

wherein A is an aryl group.

4. The new compound: the aryl mercury salt of 2,5-dichlorophenoxy acetic acid having the structural formula

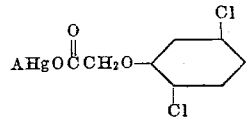

wherein A is an aryl group.

5. The new compound: the aryl mercury salt of 2,4,5-trichlorophenoxy acetic acid having the structural formula

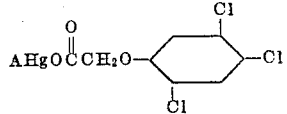

wherein A is an aryl group.

6. The new compound: the phenyl mercury salt of 2,4-dichlorophenoxy acetic acid having the structural formula

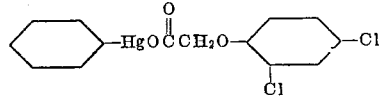

7. The new compound: the phenyl mercury salt of 2,5-dichlorophenoxy acetic acid having the structural formula

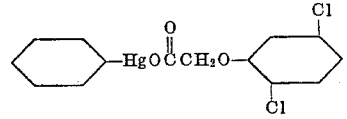

8. The new compound: the phenyl mercury salt of 2,4,5-trichlorophenoxy acetic acid having the structural formula

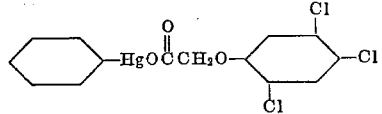

PAUL A. SARTORETTO.

REFERENCES CITED

The following references are of record in the file of this patent:

UNITED STATES PATENTS

| Number | Name | Date |
|---|---|---|
| 2,059,195 | Andersen | Nov. 3, 1936 |
| 2,085,063 | Andersen | June 29, 1937 |
| 2,103,657 | Andersen | Dec. 28, 1937 |
| 2,545,431 | Sartoretto | Mar. 13, 1951 |